(12) United States Patent
Jaber et al.

(10) Patent No.: US 11,618,016 B2
(45) Date of Patent: Apr. 4, 2023

(54) GRAFTED POLYSULFONE MEMBRANES

(71) Applicant: ENTEGRIS, INC., Billerica, MA (US)

(72) Inventors: Jad Ali Jaber, Billerica, MA (US); Alketa Gjoka, Billerica, MA (US); Saksatha Ly, Billerica, MA (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 17/503,986

(22) Filed: Oct. 18, 2021

(65) Prior Publication Data
US 2022/0032282 A1    Feb. 3, 2022

Related U.S. Application Data

(62) Division of application No. 15/738,969, filed as application No. PCT/US2015/061621 on Nov. 19, 2015, now Pat. No. 11,273,436.
(Continued)

(51) Int. Cl.
*B01J 47/12* (2017.01)
*B01D 67/00* (2006.01)
(Continued)

(52) U.S. Cl.
CPC .......... *B01J 47/12* (2013.01); *B01D 67/0093* (2013.01); *B01D 69/02* (2013.01); *B01D 71/68* (2013.01);
(Continued)

(58) Field of Classification Search
CPC ... B01J 47/12; B01J 39/05; B01J 39/19; B01J 41/07; B01J 41/13; B01D 67/0093;
(Continued)

(56) References Cited

U.S. PATENT DOCUMENTS

2003/0774351       4/2003  Charkoudian
2004/0188351 A1    9/2004  Thiele
(Continued)

FOREIGN PATENT DOCUMENTS

CN    103464014 B    6/2015
EP     2226341 A3    9/2010
(Continued)

OTHER PUBLICATIONS

Yu, et al., "Enhancing antifouling property of polysulfone ultrafiltration membrane by grafting zwitterionic copolymer via UV-initiated polymerization". Journal of Membrane Science, vol. 342, 2009, pp. 6-13, Oct. 15, 2009.
(Continued)

*Primary Examiner* — Krishnan S Menon

(57) ABSTRACT

A polysulfone membrane is modified so that monomers are wafted onto the surface of the membrane. The polysulfone membranes can be grafted by contacting the membrane with a grafting solution and exposing the membrane to electromagnetic radiation, typically within the ultraviolet portion of the spectrum. The monomers that are grafted are typically anionic or cationic. The grafted membranes can be used for filtering impurities, such as positively and negatively charged particles, from a liquid. Anionic membranes provide improved filtration of negatively charged impurities, while cationic membranes provide improved filtration of positively charged impurities.

12 Claims, 5 Drawing Sheets

Related U.S. Application Data

(60) Provisional application No. 62/185,222, filed on Jun. 26, 2015.

(51) Int. Cl.

| | | |
|---|---|---|
| *B01D 69/02* | (2006.01) | |
| *B01D 71/68* | (2006.01) | |
| *B01D 71/78* | (2006.01) | |
| *B01J 39/05* | (2017.01) | |
| *B01J 39/19* | (2017.01) | |
| *B01J 41/07* | (2017.01) | |
| *B01J 41/13* | (2017.01) | |
| *C08G 81/02* | (2006.01) | |
| *C08J 5/22* | (2006.01) | |
| *C08J 7/12* | (2006.01) | |

(52) U.S. Cl.
CPC .............. *B01D 71/78* (2013.01); *B01J 39/05* (2017.01); *B01J 39/19* (2017.01); *B01J 41/07* (2017.01); *B01J 41/13* (2017.01); *C08G 81/024* (2013.01); *C08J 5/2268* (2013.01); *C08J 5/2287* (2013.01); *C08J 7/123* (2013.01); *B01D 2323/02* (2013.01); *B01D 2323/30* (2013.01); *B01D 2323/345* (2013.01); *B01D 2323/36* (2013.01); *B01D 2323/385* (2013.01); *B01D 2325/14* (2013.01); *B01D 2325/16* (2013.01); *C08J 2381/06* (2013.01)

(58) Field of Classification Search
CPC ........ B01D 69/02; B01D 71/68; B01D 71/78; B01D 2323/02; B01D 2323/30; B01D 2323/345; B01D 2323/36; B01D 2323/385; B01D 2325/14; B01D 2325/16; C08G 81/024; C08J 5/2268; C08J 5/2287; C08J 7/123; C08J 2381/06
See application file for complete search history.

(56) References Cited

U.S. PATENT DOCUMENTS

| | | |
|---|---|---|
| 2007/0007196 A1 | 1/2007 | Komatsu |
| 2010/0096327 A1 | 4/2010 | Gin |
| 2010/0261801 A1 | 10/2010 | Weiss |
| 2013/0306551 A1 | 11/2013 | Weber |
| 2015/0136698 A1 | 5/2015 | Bothof |
| 2018/0015424 A1 | 1/2018 | Exley |

FOREIGN PATENT DOCUMENTS

| | | |
|---|---|---|
| JP | S62258711 A | 11/1987 |
| JP | H01224009 A | 9/1989 |
| JP | H02059029 | 2/1990 |
| WO | 2010058848 A1 | 5/2010 |

OTHER PUBLICATIONS

Zhao et al., "Modification polyether sulfone membranes—A review of Methods", Progress in Polymer Science, vol. 58, Issue 1, Jan. 1, 2013 (Abstract Only).

Zhou et al., "High-Throughput Membrane Surface Modification to Control NOM Fouling", Environ. Sci. Technol. 2009, 43, 10, 3865-3871 (Abstract Only).

GRAFTED POLYSULFONE MEMBRANES

CROSS-REFERENCE TO RELATED APPLICATIONS

This application is a divisional application of U.S. patent application Ser. No. 15/738,969, filed on Dec. 21, 2017, which claims the benefit of International Application No. PCT/US2015/061621, filed Nov. 19, 2015, which in turns claims priority to U.S. Provisional Application No. 62/185,222, filed on Jun. 26, 2015, the entireties of which are incorporated herein by reference.

BACKGROUND OF THE INVENTION

Chemical liquids are useful in a variety of manufacturing processes. For use in some applications, such as semiconductor manufacturing, chemical liquids must be filtered to remove particulate impurities. Porous membranes are typically made from a chemically compatible and mechanically stable polymeric matrix, and can have measurable retention, pore size or pore size distribution, and thickness. The pore size can be chosen depending upon the particle size or type of impurity to be removed, pressure drop requirements, and viscosity requirements of the application. In use, the porous membranes are generally incorporated into a device which is adapted to be inserted within a fluid stream to effect removal of particles, microorganisms or a solute from process fluids. Particles that are filtered from a liquid can have a neutral charge, or they can be positively or negatively charged.

Fluid filtration or purification is usually carried out by passing a process fluid through the membrane filter under a differential pressure across the membrane which creates a zone of higher pressure on the upstream side of the membrane than on the downstream side. Liquids being filtered experience a pressure drop across the porous membrane and the membrane is subject to a mechanical stress. This pressure differential can also result in the precipitation of dissolved gases from the liquid; the liquid on the upstream side of the porous membrane has a higher concentration of dissolved gases than the liquid on the downstream side of the porous membrane. This occurs because gases, such as air, have greater solubility in liquids at higher pressures than in liquids at lower pressures. As the liquid passes from the upstream side of the porous membrane to the downstream side, dissolved gases can come out of solution and form bubbles in the liquid and or on porous membrane surfaces. This precipitation of gas is commonly referred to as outgassing of the liquid.

Therefore, there is a need for improved membranes that are capable of filtering chemical liquids, particularly membranes that can filter charged particles from chemical liquids.

SUMMARY OF THE INVENTION

Described herein is a method of making a grafted polysulfone membrane. The method includes contacting the polysulfone membrane with an alcohol solution having a type II photoinitiator therein, contacting the polysulfone membrane with an aqueous exchange solution, contacting the polysulfone membrane with an aqueous grafting solution, and exposing the polysulfone membrane to electromagnetic radiation, thereby resulting in a grafted polysulfone membrane. The grafting solution can include an anionic or cationic monomer, sodium sulfate, and sodium persulfate.

The anionic monomer can be one or more of 2-ethylacrylic acid, acrylic acid, 2-carboxyethyl acrylate, 3-sulfopropyl acrylate potassium salt, 2-propyl acrylic acid, 2-(trifluoromethyl)acrylic acid, methacrylic acid, 2-methyl-2-propene-1-sulfonic acid sodium salt, mono-2-(methacryloyloxy)ethyl maleate, and 3-sulfopropyl methacrylate potassium salt, 2-acrylamido-2-methyl-1-propanesulfonic acid, 3-methacrylamido phenyl boronic acid, vinyl sulfonic acid, and vinyl phosphonic acid. In some instances, the anionic monomer is vinylsulfonic acid or vinylsulfonic acid sodium salt.

The cationic monomer can be one or more of 2-(dimethylamino)ethyl hydrochloride acrylate, [2-(acryloyloxy)ethyl]trimethylammonium chloride, 2-aminoethyl methacrylate hydrochloride, N-(3-aminopropyl) methacrylate hydrochloride, 2-(dimethylamino)ethyl methacrylate hydrochloride, [3-(methacryloylamino)propyl]trimethylammonium chloride solution, [2-(methacryloyloxy)ethyl]trimethylammonium chloride, acrylamidopropyl trimethylammonium chloride, 2-aminoethyl methacrylamide hydrochloride, N-(2-aminoethyl) methacrylamide hydrochloride, N-(3-aminopropyl)-methacrylamide hydrochloride, diallyldimethylammonium chloride, allylamine hydrochloride, vinyl imidazolium hydrochloride, vinyl pyridinium hydrochloride, and vinyl benzyl trimethyl ammonium chloride. In some instances, the cationic monomer is diallyldimethylammonium chloride.

The alcohol solution can include a type II photoinitiator. Benzophenone is a non-limiting example of type II photoinitiator. Without wishing to be bound by theory, the type II photoinitiator undergoes a bimolecular reaction such that the excited state of the photoinitiator interacts with a second molecule (for example polysulfone polymer chain) to generate free radicals. The alcohol solution can include isopropyl alcohol. The aqueous exchange solution can include a chaotropic salt, such as sodium sulfate. The aqueous exchange solution can include type I photoinitiators. Without wishing to be bound by theory, the type II photoinitiator undergoes a unimolecular bond cleavage upon UV irradiation to yield free radicals. Various persulfate salts, such as sodium persulfate and potassium persulfate, are a non-limiting examples of type I photoinitiators. In some instances, the aqueous exchange solution can include one or more of sodium sulfate and sodium persulfate. In some instances, the alcohol solution can include benzophenone and isopropyl alcohol, and the aqueous exchange solution can include sodium sulfate and sodium persulfate.

Typically, the electromagnetic radiation has a wavelength between about 200 nm and about 600 nm.

Described herein is a method of making a grafted polysulfone membrane. The method includes contacting the polysulfone membrane with an alcohol solution that includes a type II photoinitiator (e.g., benzophenone), contacting the polysulfone membrane with an aqueous exchange solution, contacting the polysulfone membrane with an aqueous grafting solution, and exposing the polysulfone membrane to electromagnetic radiation, thereby resulting in a grafted polysulfone membrane. The aqueous grafting solution can include an anionic or cationic monomer, sodium sulfate, and a type I photoinitiator (e.g., sodium persulfate, potassium persulfate, or ammonium persulfate).

Described herein is a grafted polysulfone membrane. Typically, the grafted polysulfone membrane has one or more anionic or cationic monomers grafted onto one or more surfaces of the membrane, wherein the grafted polysulfone membrane having a water flow rate that is at least 75% of the water flow rate of an ungrafted polysulfone membrane. In some instances, the grafted polysulfone membrane has a bubble point between about 65 psi and about 75 psi when determined by an HFE 7200 (ethoxy-nonafluorobutane) bubble point test. In some instances, the grafted polysulfone membrane has a water flow rate that is at least 75% of the water flow rate of an ungrafted polysulfone membrane having a bubble point between about 65 psi and about 75 psi when determined by an HFE 7200 (ethoxy-nonafluorobutane) bubble point test.

In some instances, the monomer is anionic. The anionic monomer can be 2-ethylacrylic acid, acrylic acid, 2-carboxyethyl acrylate, 3-sulfopropyl acrylate potassium salt, 2-propyl acrylic acid, 2-(trifluoromethyl)acrylic acid, methacrylic acid, 2-methyl-2-propene-1-sulfonic acid sodium salt, mono-2-(methacryloyloxy)ethyl maleate, and 3-sulfopropyl methacrylate potassium salt, 2-acrylamido-2-methyl-1-propanesulfonic acid, 3-methacrylamido phenyl boronic acid, vinyl sulfonic acid, or vinyl phosphonic acid. In some instances, anionic monomer is diallyldimethylammonium chloride. In some instances, anionic monomer is vinylsulfonic acid or vinylsulfonic acid sodium salt.

In some instances, the monomer is cationic. The cationic monomer can be 2-(dimethylamino)ethyl hydrochloride acrylate, [2-(acryloyloxy)ethyl]trimethylammonium chloride, 2-aminoethyl methacrylate hydrochloride, N-(3-aminopropyl) methacrylate hydrochloride, 2-(dimethylamino)ethyl methacrylate hydrochloride, [3-(methacryloylamino)propyl]trimethylammonium chloride solution, [2-(methacryloyloxy)ethyl]trimethylammonium chloride, acrylamidopropyl trimethylammonium chloride, 2-aminoethyl methacrylamide hydrochloride, N-(2-aminoethyl) methacrylamide hydrochloride, N-(3-aminopropyl)-methacrylamide hydrochloride, diallyldimethylammonium chloride, allylamine hydrochloride, vinyl imidazolium hydrochloride, vinyl pyridinium hydrochloride, or vinyl benzyl trimethyl ammonium chloride.

Each of the monomers can be provided in a suitable salt form. As one example, the monomer vinyl sulfonic acid can be provided as vinyl sulfonic acid sodium salt.

In some instances, the grafted polysulfone membrane has a dye binding capacity between about 1 $\mu g/cm^2$ and about 5 $\mu g/cm^2$, or between about 1 $\mu g/cm^2$ and about 3 $\mu g/cm^2$, or more between about 2 $\mu g/cm^2$ and about 3 $\mu g/cm^2$.

In some instances, the brittleness of the grafted polysulfone membrane in the machine direction does not exceed the brittleness of the ungrafted polysulfone membrane in the machine direction by more than 30%. In some instances, the brittleness of the grafted polysulfone membrane in the crossweb direction does not exceed the brittleness of the ungrafted polysulfone membrane in the crossweb direction by more than 30%.

Described herein is a method of removing an impurity from a liquid. The method includes contacting the liquid with a polysulfone membrane grafted as described herein. The impurity can be a negatively charged particle, such as negatively charged gold, or a negatively charged ion, such as Ponceau-s. The impurity can be a positively charged particle, such as positively charged gold, or a positively charged ion, such as methylene blue.

The methods described herein produce membranes with improved filtration properties, particularly for charged particles in a solution. Grafting an anionic monomer onto a polysulfone membrane yields a negatively charged membrane, which provides improved filtration of positively charged dyes and particles. Grafting a cationic monomer onto a polysulfone membrane yields a positively charged membrane, which provides improved filtration of negatively charged dyes and particles. Additionally, the methods produce membranes that have a high flow rate and that retain the strength and integrity of an unmodified membrane.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3A is the tight side (e.g., having smaller pores) at 5000× magnification. FIG. 3B is the open side (e.g., having larger pores) at 5000× magnification. FIG. 3C is a cross-sectional view, with the open side on top and the tight side on bottom, at 1400× magnification.

DETAILED DESCRIPTION OF THE INVENTION

Figure 1:
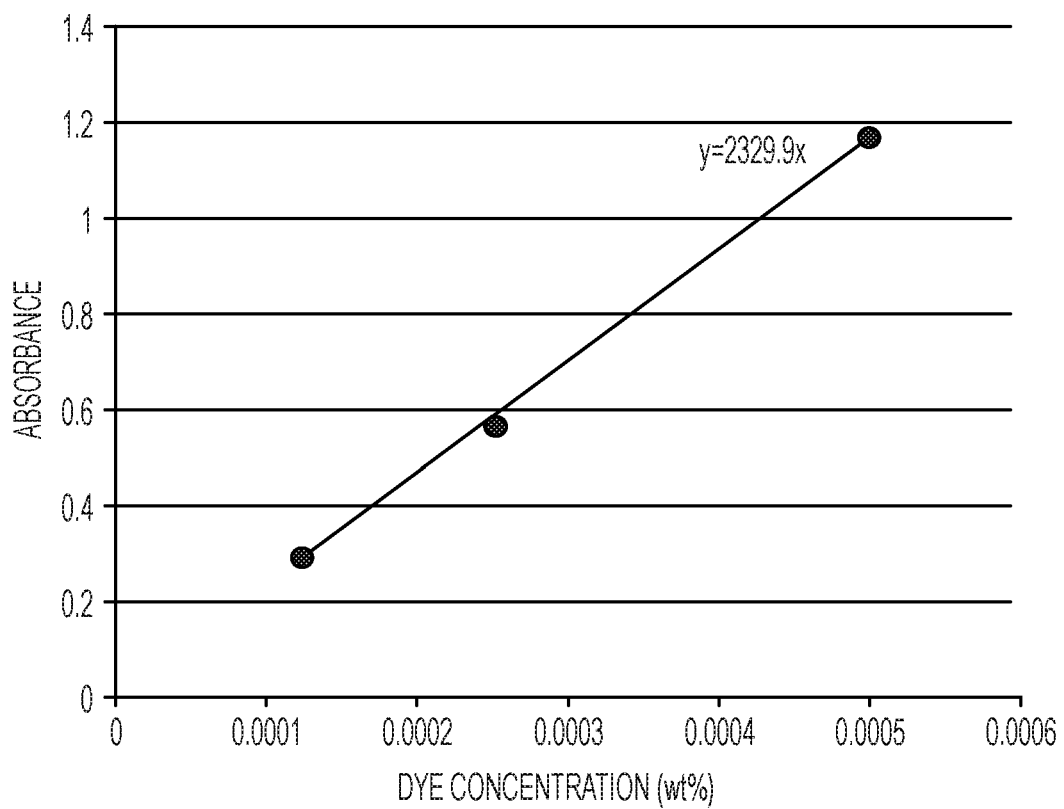
FIG. 1 is a calibration curve showing the absorbance of three methylene blue dye solutions with known concentrations determined using a Cary Spectrophotomer operating at 665 nm wavelength (y=2329.9x).

A description of example embodiments of the invention follows.

Before the present compositions and methods are described, it is to be understood that this invention is not limited to the particular molecules, compositions, methodologies or protocols described, as these may vary. It is also to be understood that the terminology used in the description is for the purpose of describing the particular version or versions only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "pore" is a reference to one or more pores and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of versions of the present invention, the non-limiting examples of methods, devices, and materials are now described.

Monomer Grafting onto Membranes

Grafting refers to chemically linking a moiety such as a monomer, oligomer, or other molecule to the polymeric porous membrane surfaces, including inner pore surfaces, of the porous membrane. A grafted membrane refers to a membrane having one or more types of monomers grafted onto one or more surfaces of the membrane.

The claimed invention is based, in part, in the discovery that monomers can be grafted onto the surface of a polysulfone membrane upon exposure to electromagnetic radiation, typically within the UV wavelength. Typically, the monomers are categorized as cationic or anionic.

Suitable cationic monomers include acrylate, methacrylate, acrylamide, methacrylamide and vinyl types having a quaternary ammonium, imidazolium, phosphonium, guanidinium, sulfonium, or pyridinium functionality. Examples of suitable acrylate monomers include 2-(dimethylamino)ethyl hydrochloride acrylate, [2-(acryloyloxy)ethyl] trimethylammonium chloride. Examples of suitable methacrylate monomers include 2-aminoethyl methacrylate hydrochloride, N-(3-aminopropyl) methacrylate hydrochloride, 2-(dimethylamino)ethyl methacrylate hydrochloride, [3-(methacryloylamino)propyl]trimethylammonium chloride solution, and [2-(methacryloyloxy)ethyl]trimethylammonium chloride. Examples of suitable acrylamide monomers include acrylamidopropyl trimethylammonium chloride. Examples of suitable methacrylamide monomers include 2-aminoethyl methacrylamide hydrochloride, N-(2-aminoethyl) methacrylamide hydrochloride, and N-(3-aminopropyl)-methacrylamide hydrochloride. Other suitable monomers include diallyldimethylammonium chloride, allylamine hydrochloride, vinyl imidazolium hydrochloride, vinyl pyridinium hydrochloride, and vinyl benzyl trimethyl ammonium chloride.

Suitable anionic monomers include acrylate, methacrylate, acrylamide, methacrylamide and vinyl types having a sulfonic acid, carboxylic acid, phosphonic acid or phosphoric acid functionality. Examples of suitable acrylate monomers include 2-ethylacrylic acid, acrylic acid, 2-carboxyethyl acrylate, and 3-sulfopropyl acrylate potassium salt, 2-propyl acrylic acid, and 2-(trifluoromethyl)acrylic acid. Examples of suitable methacrylate monomers include methacrylic acid, 2-methyl-2-propene-1-sulfonic acid sodium salt, mono-2-(methacryloyloxy)ethyl maleate, and 3-sulfopropyl methacrylate potassium salt. Examples of suitable acrylamide monomers include 2-acrylamido-2-methyl-1-propanesulfonic acid. Examples of suitable methacrylamide monomers include 3-methacrylamido phenyl boronic acid. Other suitable monomers include vinyl sulfonic acid and vinyl phosphonic acid.

One example of a cationic monomer is diallyldimethylammonium chloride (DADMAC). Without wishing to be bound by theory, the double-bond portion of the monomer is suitable for radical polymerization. A positively charged group, such as the quaternary nitrogen atom of DADMAC, provides an electrostatic interaction with negatively charged impurities.

One example of an anionic monomer is vinylsulfonic acid, which can be provided as in a suitable salt form, such as vinylsulfonic acid sodium salt. Without wishing to be bound by theory, the vinyl or allyl portion of the monomer is suitable for radical polymerization, particularly in the presence of a reducing agent. A negatively charged group, such as the sulfonate portion of vinyl sulfonic acid, provides an electrostatic interaction with positively charged impurities.

In order to graft the monomers onto a polysulfone membrane, the membrane is typically wet with an alcohol, such as isopropyl alcohol (IPA), which can include a type II photoinitiator, such as benzophenone. Then, the membrane is placed in an aqueous exchange solution, which can include a chaotropic salt, such as sodium sulfate, and a type I photoinitiator, such as sodium persulfate. The aqueous exchange solution removes the wetting solution. Next, the membrane is placed in a grafting solution, which contains the monomer as well a chaotropic salt and a type I photoinitiator, which are typically the same as used in the aqueous exchange solution. The membrane is then exposed to electromagnetic radiation, typically within the ultraviolet portion of the spectrum, in order to graft the monomer onto the membrane. Typically, a UV light source emits light from about 200 nm to about 600 nm, with UV radiation from about 200 nm to about 350 nm causing excitation of the type II photoinitiator, such as benzophenone.

Varying the concentrations of the components can yield membranes having different properties, as described more completely in Example 13. Increasing the concentration of benzophenone photoinitiator in the alcohol wetting solution can cause an increase in dye binding capacity and a decrease in water flow rate. Increasing the concentration of sodium persulfate radical initiator results in a membrane having both increased flow rate and increased dye binding capacity, thereby indicating that more functional groups have been grafted onto the surface of the membrane. The line speed of the membrane through the UV chamber can also be adjusted. Typically, increasing the line speed yields a grafted membrane having a higher flow rate, but decreased dye binding capacity. However, the dye binding capacity, measured in $\mu g/cm^2$, decreased, which is indicates that fewer monomers have grafted onto the surface of the membrane, thereby reducing the amount of charge on the membrane. The monomer concentration can also be adjusted. Increasing the monomer concentration increased the dye binding capacity, and did not affect the flow rate.

Membranes

Porous membranes are typically polysulfone, polyethersulfone or polyarylsulfone membranes. These membranes are desirable membranes for use in filtration application because they provide a high flow rate at a low differential pressure, compared to other membranes (e.g., nylon and PTFE). The pore size of the membrane can range from microporous to nanoporous. A microporous membrane can have an average pore size ranging on the order of from about 0.01 microns to about 50 microns, and can be chosen depending upon the particle size or type of impurity to be removed, pressure drop requirements, and viscosity requirements of the application. A nanoporous membrane can have an average pore size ranging from about 1 nanometer to about 100 nanometers.

The porous membrane can comprise a single porous layer, a layer having a pore size gradient, or multilayer membrane. The porous membrane can include a variety of morphologies such as lacy, string and node, open cellular, nodular or other membrane morphologies. The membrane can have a symmetric or asymmetric pore structure. A symmetric membrane has pores of similar sizes on both sides of the membrane, while an asymmetric membrane has pores of different sizes on both sides of the membrane.

The membrane can have any convenient geometric configuration, such as a flat sheet, a corrugated sheet, a hollow fiber or the like. The membrane can be supported or unsupported, isotropic or anisotropic, skinned or unskinned or can be a composite membrane. The membrane substrate can have a thickness between about 5 microns and about 250 microns, preferably between about 10 microns and about 200 microns, and more preferably between about 100 microns and about 150 microns. In some instances, the membrane is about 130 microns thick.

The membrane can be a single layer membrane having pore sizes or a distribution of pore size that provide sieving particle retention. In some versions the treated porous membrane comprises a plurality of layers which have pores that have the same size in the various layers or in still other versions the porous membrane can comprises a plurality of layers which have pores that have different sizes in the various layers. In some versions the porous membrane can include a filtration layer supported by one or more support layers or layers of different porosity. The layers can provide support for an inner filtration layer, for example large pore size support layers on either side of a tight, smaller pore filtration layer. The layer may be a skinned membrane, may be a membrane without a discernable layer structure, or it may include a gradient of pores or a distribution of pore sizes. In some versions, the porous membrane can be a nanoporous membrane.

Membrane Filtration

In order to assess the performance characteristics of the grafted polysulfone membrane, a dye binding test can be performed, as in Examples 6 and 7. A positively charged dye, such as methylene blue, can bind to a negatively charged membrane, and the amount of dye complexed with the membrane correlates with the amount of surface modification during the grafting process. Similarly, a negatively charged dye, such as Ponceau-S dye, can bind to a positively charged membrane, and the amount of dye complexed with the membrane correlates with the amount of surface modification during the grafting process. The dye binding tests are representative examples showing complexing of charged molecules to the surface of the grafted polysulfone membranes.

In order to assess the effectiveness of the grafted polysulfone membranes in filtering charged particles, the membranes can be used to filter model solutions of positively or negatively charged gold nano-particles, as in Examples 8 and 9. Polysulfone membranes grafted with a negatively charged monomer, such as vinylsulfonic acid, can be used to filter positively charged gold nano-particles. Similarly, polysulfone membranes grafted with a positively charged monomer, such as diallyldimethylammonium chloride (DADMAC), can be used to filter negatively charged gold nano-particles. The pH of the model solutions that is filtered can be adjusted so that the solution is acidic (e.g., pH<7), basic (e.g., pH>7, or neutral (e.g., pH=7). The gold nano-particle filtration tests are representative examples showing improved filtration of charged particles by the grafted polysulfone membranes.

Porosimetry Bubble Point

A porosimetry bubble point test method measures the pressure required to push air through the wet pores of a membrane. A bubble point test is a well-known method for determining the pore size of a membrane.

Scanning Electron Microscopy (SEM)

Scanning electron microscopy can be used to observe the surfaces of a membrane and determine whether changes to the membrane surface have occurred during a grafting process. The inventors have observed that the bubble point of the membrane is substantially before and after grafting.

Water Flow Rate

Water flow rate is determined by cutting membranes into 47 mm disks and wetting with water before placing the disk in a filter holder with a reservoir for holding a volume of water. The reservoir is connected to a pressure regulator. Water is flowed through the membrane under 14.2 psi (pounds per square inch) differential pressure. After equilibrium is achieved, the time for 10 ml of water to flow through the membrane is recorded.

EXEMPLIFICATION

Example #1

This example describes the preparation of a wetting solution.

0.16 grams of benzophenone (99%, Sigma-Aldrich) were dissolved in 40 ml of isopropyl alcohol (IPA) to obtain 0.4 wt % benzophenone solution.

Example #2

This example describes the preparation of an aqueous exchange solution.

1.42 g of sodium sulfate (Sigma) and 0.4 g of sodium persulfate (Sigma) were dissolved in 40 ml of DI water with continuous mixing for 10 minutes at room temperature.

Example #3

This example describes the preparation of an aqueous grafting solution containing anionic moieties and a radical initiator.

A solution was made containing 2 g vinylsulfonic acid (VS, 25% in water, Sigma), 1.43 g sodium sulfate, 0.4 g sodium persulfate, and 36.17 g water. Complete dissolution occurred after continued mixing for 10 minutes at room temperature.

Example #4

This example describes the preparation of an aqueous grafting solution containing cationic moieties and a radical initiator.

A solution was made containing 4 g diallyldimethylammonium chloride (DADMAC, 65% in water, Sigma), 1.43 g sodium sulfate, 0.2 g sodium persulfate, and 34.37 g water. Complete dissolution occurred after continued mixing for 10 minutes at room temperature.

Example #5

This example demonstrates the surface modification of a polysulfone membrane to include cationic or anionic moieties.

A 47 mm disk of 30 nm pore size rated polysulfone membrane (Fuji) was wet for 25 seconds with the 0.4% benzophenone solution described in Example 1. The polysulfone membrane was rinsed with the exchange solution described in Example 2 in order to remove the IPA. The membrane disk was then introduced into the grafting solution described in Example 3 or Example 4. The dish was covered and the membrane was soaked in the grafting solution for 2 minutes. The membrane disk was removed and placed between 1 mil polyethylene sheets. The excess solution was removed by rolling a rubber roller over the polyethylene/membrane disk/polyethylene sandwich as it lays flat on a table. The polyethylene sandwich was then taped to a transport unit which conveyed the assembly through a Fusion Systems broadband UV exposure lab unit emitting at wavelengths from 200 nm to 600 nm. Time of exposure is controlled by how fast the assembly moves through the UV unit. In this example, the assembly moved through the UV chamber at 7 feet per minute. After emerging from the UV unit, the membrane was removed from the sandwich and immediately placed in deionized (DI) water, where it was washed by swirling for 5 minutes. Next, the treated membrane sample was washed in methanol for 5 minutes. Following this washing procedure the membrane was dried on a holder in an oven operating at 50° C. for 10 min.

The average water flow rate of three samples tested with the DADMAC and VS modified membranes was 82 and 87 ml/min, respectively. The average water flow rate of three samples of unmodified membrane tested was 104 ml/min.

Example #6

This example demonstrates the dye binding capacity of a polysulfone membrane grafted with a grafting solution containing a VS monomer. This example further demonstrates that the process of Example 5, when performed with the grafting solution of Example 3, yields a negatively charged polysulfone membrane.

The dry 47 mm disk membrane of Example 5, modified with the grafting solution of Example 3, was placed in a beaker containing 0.00075 wt % methylene blue dye (Sigma). The beaker was covered and the membrane was soaked for 5 minutes with continuous mixing at room temperature. The membrane disk was then removed and the absorbance of the dye solution was measured using a Cary spectrophotometer (Agilent Technologies) operating at 606 nm and compared to the absorbance of starting solution (before membrane soaking). The dye is cationic in nature, and it bound to the negatively charged membrane with an average dye binding capacity of 2.1 µg/cm$^2$. The slope of the calibration curve depicted in FIG. 1 was used to convert dye solution absorbance data before and after soaking the membrane to wt % of dye, which is then converted to the mass of dye bound per membrane unit area. In contrast, unmodified membrane had an average dye binding capacity of 0.2 µg/cm$^2$ under similar experimental conditions.

Example #7

This example demonstrates the dye binding capacity of a polysulfone membrane grafted with a grafting solution containing a DADMAC monomer. This example further demonstrates that the process of Example 5, when performed with the grafting solution of Example 4, yields a positively charged polysulfone membrane.

Figure 2:
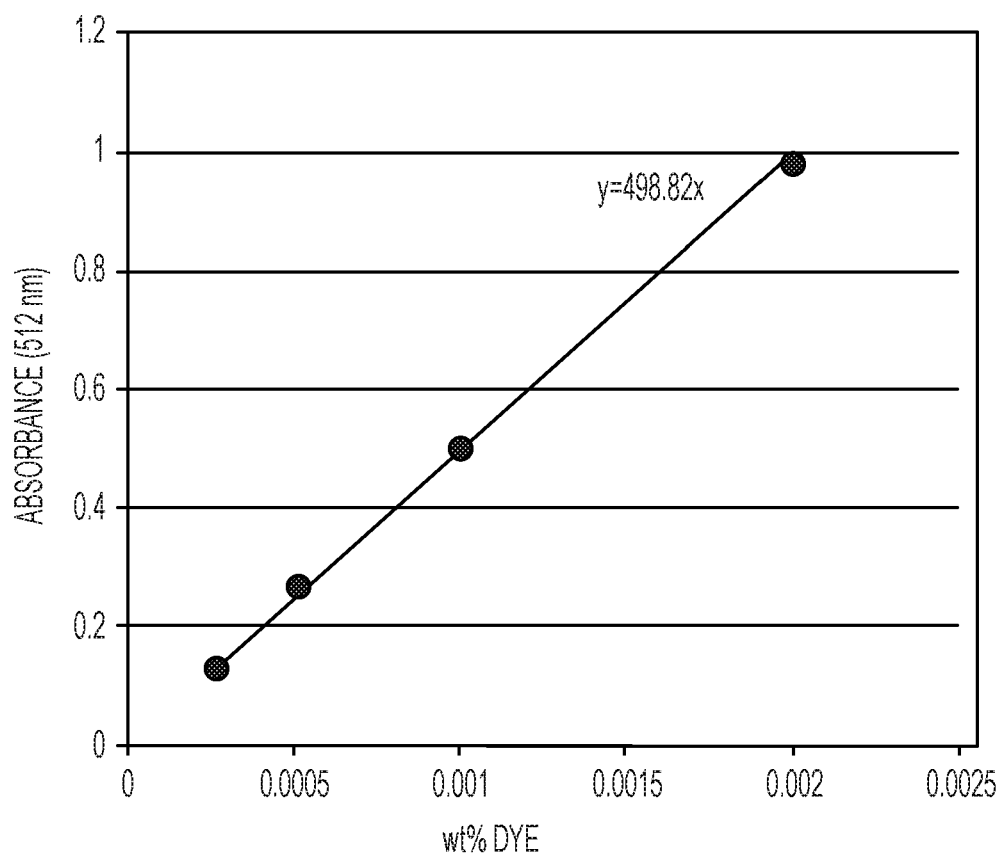
FIG. 2 is a calibration curve showing the absorbance of four Ponceau-S dye solutions with known concentrations determined using a Cary Spectrophotomer operating at 520 nm wavelength (y=498.82x).

The dry 47 mm disk membrane of Example 5, modified with the grafting solution of Example 4, was placed in a beaker containing 0.002 wt % Ponceau-S dye (Sigma). The beaker was covered and the membrane was soaked for 5 minutes with continuous mixing at room temperature. The membrane disk was then removed and the absorbance of the dye solution was measured using a Cary spectrophotometer (Agilent Technologies) operating at 512 nm and compared to the absorbance of starting solution (before membrane soaking). The dye is anionic in nature, and it bound to the positively charged membrane, with an average dye binding capacity of 3 m/cm$^2$. The slope of the calibration curve depicted in FIG. 2 was used to convert dye solution absorbance data before and after soaking the membrane to wt % of dye, which is then converted to the mass of dye bound per membrane unit area. In contrast, unmodified membrane had an average dye binding capacity of 0.2 µg/cm$^2$ under similar experimental conditions.

Example #8

This example demonstrates the effectiveness of a polysulfone membrane grafted with VS monomer, according to Examples 3 and 5, in removing a model impurity from a model solution at pH 3, 5 and 10.6.

A 50 ppb model solution of gold nano-particles was prepared as follows: 1 ml of gold nano-particles stock solution (positively charged 5 nm gold) was add to 2 L of DI water. The pH of the solution was adjusted by adding a few drops of 1 M sodium hydroxide or 1 M hydrochloric acid solution.

A 96 mm disk of the membrane prepared according to Examples 3 and 5 was immersed in IPA followed by DI water to exchange the IPA with DI water. Subsequently, the membrane was placed in a test stand and challenged with 52 ml of the 50 ppb model solution with an inlet pressure of 8-15 psi to maintain a flow rate of 25 ml/min. ICP-MS was used to quantify the concentration of gold nano-particles in the filtrate and starting solution. Gold nano-particle removal efficiency of the modified membrane was 100% at pH 3, 5 and 10.6. In comparison, unmodified polysulfone membrane showed 2.2%, 84%, and 38% removal efficiency at pH 3, 5 and 10.6, respectively.

Example #9

This example demonstrates the effectiveness of a polysulfone membrane grafted with DADMAC monomer, according to Examples 4 and 5, in removing a model impurity from model solution at pH 3, 5 and 10.6.

A 50 ppb model solution of gold nano-particles was prepared as follows: 1 ml of gold nanoparticles stock solution (negatively charged 5 nm gold) was add to 2 L of DI water. The pH of the solution was adjusted by adding a few drops of 1 M sodium hydroxide or 1 M hydrochloric acid solution.

A 96 mm disk of the membrane prepared according to Examples 4 and 5 was immersed in IPA followed by DI water to exchange the IPA with DI water. Subsequently, the membrane was placed in a test stand and challenged with 52 ml of the 50 ppb model solution with an inlet pressure of 8-15 psi to maintain a flow rate of 25 ml/min. ICP-MS was used to quantify the concentration of gold nano-particles in the filtrate and starting solution. Gold nano-particle removal efficiency of the modified membrane was 100% at pH 3, 5 and 10.6. In comparison, unmodified polysulfone membrane showed 8%, 100%, and 51% removal efficiency at pH 3, 5 and 10.6, respectively.

Example #10: Bubble Point

The porosimetry bubble point test method measures the pressure required to push air through the wet pores of a membrane.

The test was performed by mounting a 47 mm disk of a dry membrane sample in a holder with the tight side (e.g., having smaller pores in an asymmetric membrane) of the membrane facing down. The holder is designed in a way to allow the operator to place a small volume of liquid on the upstream side of the membrane. The dry air flow rate of the membrane is measured first by increasing the air pressure on the upstream side of the membrane to 150 psi. The pressure is then released back to atmospheric pressure and a small volume of ethoxy-nanofluorobutane (available as HFE 7200, 3M Specialty Materials, St. Paul, Minn., USA) is placed on the upstream side of the membrane to wet the membrane. The wet air flow rate is then measured by increasing the pressure again to 150 psi. The bubble point of the membrane is measured from the pressure required to displace HFE from the pores of the HFE-wet membrane. This critical pressure point is defined as the pressure at which a first non-linear increase of wet air flow is detected by the flow meter.

The range of observed bubble point for membranes used in this application (65-75 psi). Both the ungrafted and grafted membranes had an average bubble point of 66 psi.

Example #11: Scanning Electron Microscopy (SEM)

Scanning electron microscopy permits visualization of the surface and cross-section characteristics of a membrane.

Samples of membranes were gold sputtered before scanning at an accelerating voltage of 10 kV using FEI Quanta 200 SEM System (available from FEI Company, Hillsboro, Oreg., USA). The cross-sections were obtained by freeze fracturing the samples in liquid nitrogen.

Figure 3A:
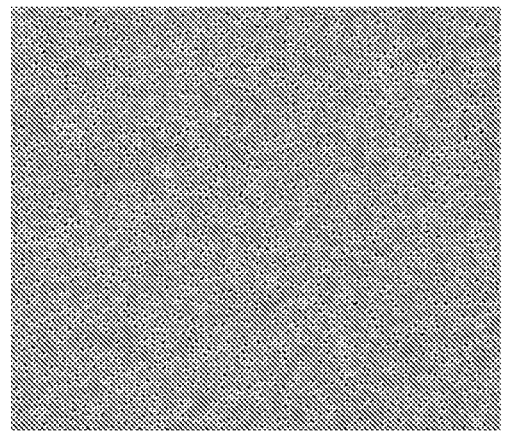
FIGS. 3A-C are SEM images of an ungrafted asymmetric polysulfone membrane.
Figure 3B:
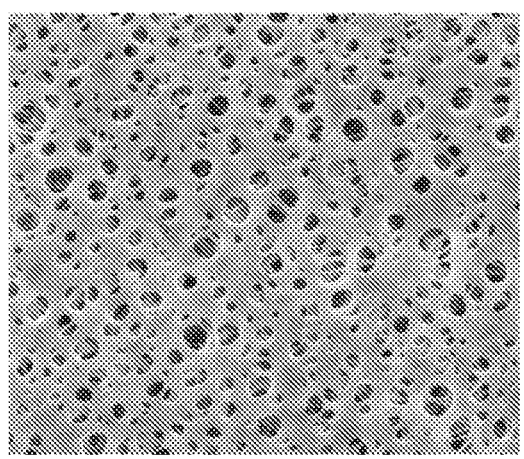
Figure 3C:
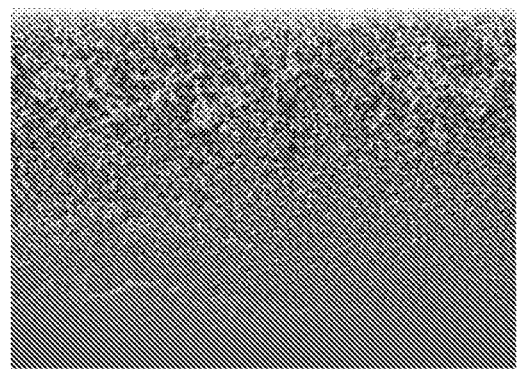

FIGS. 3A-C are SEM images of an ungrafted, asymmetric polysulfone membrane. FIG. 3A is the tight side (e.g., having smaller pores) at 5000× magnification. FIG. 3B is the open side (e.g., having larger pores) at 5000× magnification. FIG. 3C is a cross-sectional view, with the open side on top and the tight side on bottom, at 1400× magnification.

Example 12

This example illustrates the impact of the disclosed grafting technique on the mechanical properties of the grafted membranes.

The membranes grafted according to Examples 5 using the grafting solution with vinylsulfonic acid monomer as described in Example 3 were used in this Example. Impact of disclosed grafting technique on the mechanical properties of the membrane was determined as described in J Mater Sci (2010) 45:242-250 by calculating the membrane Brittleness.

Brittleness=1/(SE) where S is the tensile strain at break and E is the storage modulus as determined by dynamic mechanical analysis (DMA). The tensile strain at break of the membranes before and after grafting was evaluated using Instron™ Model 3342 Compression/Tensile instrument equipped with Instron™ Force Transducer model 2519-102, computer and Blue Hill software. Data for the storage modulus E for grafted and ungrafted membranes was collected from Dynamic Mechanical Analysis (DMA) using strain sweeps in the 0.05-2.0% at frequency 1.0 Hz and at temperature of 30 C.

Three samples in the machine direction and three samples in the cross web direction from each membrane were tested by continuously stretching the sample until it breaks. A metal die cutter was used to cut sample with 1"×4.5" dimensions. For DMA analysis, sample geometry was 10 mm in length and 6.5 mm in width.

Compared to ungrafted membrane, brittleness of the grafted membrane increased by 25% in the machine direction and 13% in the crossweb direction, as indicated in Table 1.

TABLE 1

|  | Brittleness (% $Pa^{-1}$) of ungrafted membrane | Brittleness (% $Pa^{-1}$) of grafted membrane |
| --- | --- | --- |
| Average Machine direction | 2.52E−10 | 3.15E−10 |
| Average Crossweb direction | 2.62E−10 | 2.97E−10 |

Example 13

This example illustrates the impact of the disclosed grafting technique on the mechanical properties of the grafted membranes.

Figure 4:
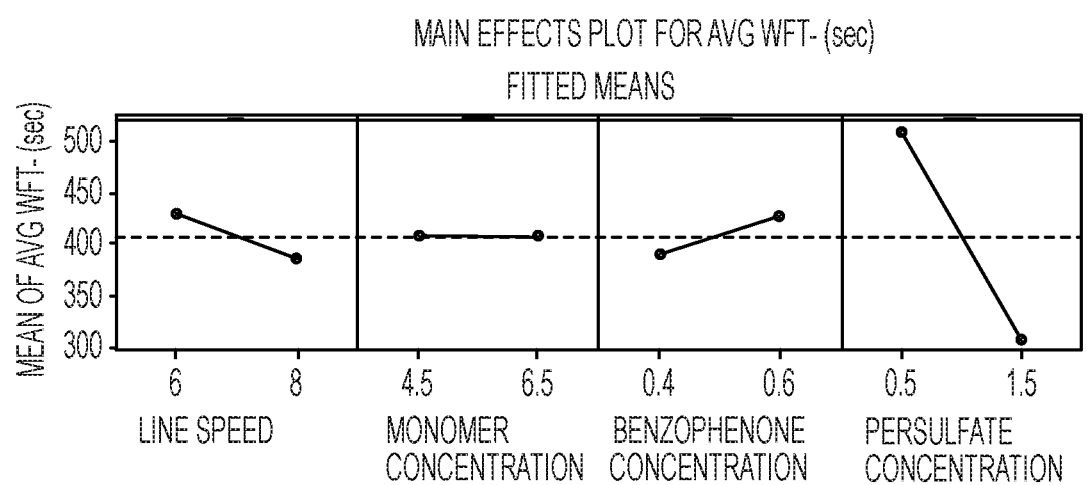
FIG. 4 is a series of graphs showing the effects of line speed, monomer, benzophenone and persulfate concentration on mean average water flow time of a grafted polysulfone membrane.
Figure 5:
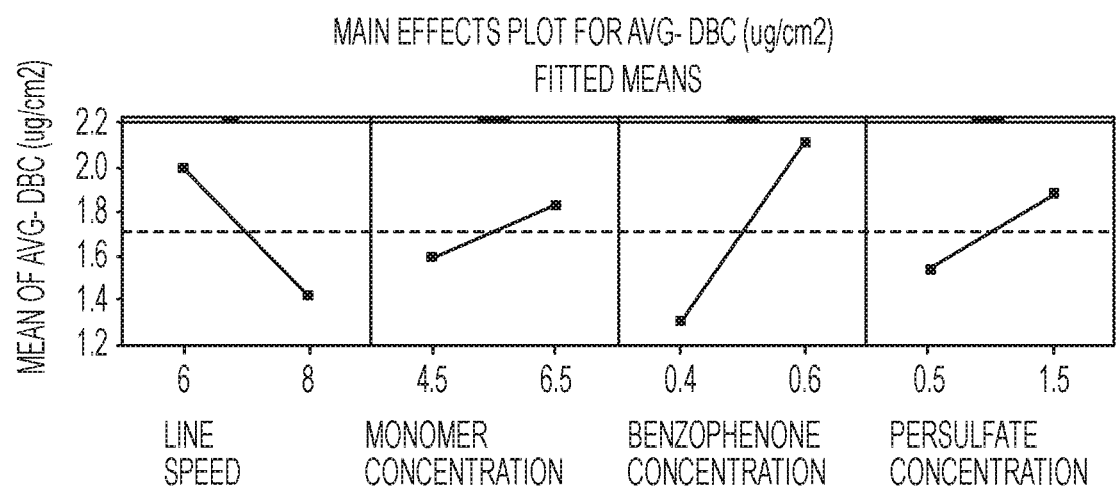
FIG. 5 is a series of graphs showing the effects line speed, monomer, benzophenone and persulfate concentration on dye binding capacity of a grafted polysulfone membrane.

A polysulfone membrane was grafted with vinyl sylfonic acid sodium salt, and dye binding capacity was determined using methylene blue. The results are illustrated in FIGS. 4 and 5.

Increasing the concentration of benzophenone photoinitiator in the alcohol wetting solution can cause an increase in dye binding capacity and a decrease in water flow rate. For example, increasing the concentration of benzophenone photoinitiator in the alcohol wetting solution from 0.4 wt % to 0.6 wt % resulted in an increase in dye binding capacity from 1.3 $\mu g/cm^2$ to 2.1 $\mu g/cm^2$, as well as a decrease in water flow rate, as measured by an increase in water flow time from 370 seconds to 425 seconds measured at 14.2 psi positive pressure for 500 ml of water at room temperature.

Increasing the concentration of sodium persulfate radical initiator resulted in a membrane having both increased flow rate and increased dye binding capacity, thereby indicating that more functional groups have been grafted onto the surface of the membrane.

The line speed of the membrane through the UV chamber can also be adjusted. Typically, increasing the line speed yields a grafted membrane having a higher flow rate, but decreased dye binding capacity. In one particular example, increasing the line speed from 6 feet/minute to 8 feet/minute resulted in a grafted membrane having a higher flow rate, which is indicative of less plugging of the membrane. However, the dye binding capacity, measured in $\mu g/cm^2$, decreased, which is indicates that fewer monomers have grafted onto the surface of the membrane, thereby reducing the amount of charge on the membrane.

The monomer concentration can also be adjusted. Increasing the monomer concentration increased the dye binding capacity, and did not affect the flow rate.

EQUIVALENTS

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant to mean an example, rather than the best. It is also to be appreciated that features and/or elements depicted herein are illustrated with particular dimensions and/or orientations relative to one another for purposes of simplicity and ease of understanding, and that the actual dimensions and/or orientations may differ substantially from that illustrated herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method of making a grafted polysulfone membrane, comprising:
    a) contacting the polysulfone membrane with an alcohol solution comprising benzophenone;
    b) contacting the polysulfone membrane with an aqueous exchange solution;
    c) contacting the polysulfone membrane with an aqueous grafting solution comprising:
        i) an anionic or cationic monomer;
        ii) sodium sulfate; and
        iii) sodium persulfate; and
    d) exposing the polysulfone membrane to electromagnetic radiation, thereby resulting in a grafted polysulfone membrane.

2. The method of claim 1, wherein the anionic monomer is one or more of 2-ethylacrylic acid, acrylic acid, 2-carboxyethyl acrylate, 3-sulfopropyl acrylate potassium salt, 2-propyl acrylic acid, 2-(trifluoromethyl)acrylic acid, methacrylic acid, 2-methyl-2-propene-1-sulfonic acid sodium salt, mono-2-(methacryloyloxy)ethyl maleate, and 3-sulfopropyl methacrylate potassium salt, 2-acrylamido-2-methyl-1-propanesulfonic acid, 3-methacrylamido phenyl boronic acid, vinyl sulfonic acid, and vinyl phosphonic acid.

3. The method of claim 1, wherein the anionic monomer is vinylsulfonic acid or vinylsulfonic acid sodium salt.

4. The method of claim 1, wherein the cationic monomer is one or more of 2-(dimethylamino)ethyl hydrochloride acrylate, [2-(acryloyloxy)ethyl]trimethylammonium chloride, 2-aminoethyl methacrylate hydrochloride, N-(3-aminopropyl) methacrylate hydrochloride, 2-(dimethylamino) ethyl methacrylate hydrochloride, [3-(methacryloylamino)propyl]trimethyl ammonium chloride solution, [2-(methacryloyloxy)ethyl]trim ethyl ammonium chloride, acrylamidopropyl trim ethyl ammonium chloride, 2-aminoethyl methacrylamide hydrochloride, N-(2-aminoethyl) methacrylamide hydrochloride, N-(3-aminopropyl)-methacrylamide hydrochloride, diallyldimethylammonium chloride, allylamine hydrochloride, vinyl imidazolium hydrochloride, vinyl pyridinium hydrochloride, and vinyl benzyl trimethyl ammonium chloride.

5. The method of claim 1, wherein the cationic monomer is diallyldimethylammonium chloride.

6. The method of claim 1, wherein the alcohol solution comprises isopropyl alcohol.

7. The method of claim 1, wherein the aqueous exchange solution comprises a chaotropic salt.

8. The method of claim 7, wherein the chaotropic salt is sodium sulfate.

9. The method of claim 1, wherein the aqueous exchange solution comprises sodium persulfate.

10. The method of claim 1, wherein the aqueous solution comprises one or more of sodium sulfate and sodium persulfate.

11. The method of claim 1, wherein the alcohol solution comprises isopropyl alcohol, and wherein the aqueous exchange solution comprises sodium sulfate and sodium persulfate.

12. The method of claim 1, wherein the electromagnetic radiation has a wavelength between about 200 nm and about 600 nm.

* * * * *